US012638080B2

(12) United States Patent
Rowe

(10) Patent No.: US 12,638,080 B2
(45) Date of Patent: May 26, 2026

(54) COVER

(71) Applicant: Joshua B. Rowe, Magnolia, TX (US)

(72) Inventor: Joshua B. Rowe, Magnolia, TX (US)

( * ) Notice: Subject to any disclaimer, the term of this patent is extended or adjusted under 35 U.S.C. 154(b) by 912 days.

(21) Appl. No.: 17/561,825

(22) Filed: Dec. 24, 2021

(65) Prior Publication Data

US 2023/0047718 A1 Feb. 16, 2023

Related U.S. Application Data

(63) Continuation-in-part of application No. 17/402,235, filed on Aug. 13, 2021, now abandoned.

(51) Int. Cl.
| | |
|---|---|
| *F16J 13/18* | (2006.01) |
| *E05C 19/00* | (2006.01) |
| *E06B 5/00* | (2006.01) |
| *F16L 55/00* | (2006.01) |

(52) U.S. Cl.
CPC ............. *F16J 13/18* (2013.01); *E05C 19/007* (2013.01); *E06B 5/00* (2013.01); *F16L 55/00* (2013.01)

(58) Field of Classification Search
CPC ........... F16J 13/18; E05C 19/007; E06B 5/00; F16L 55/00; E03B 3/16
USPC ........................................................ 454/195
See application file for complete search history.

(56) References Cited

U.S. PATENT DOCUMENTS

| | | | | |
|---|---|---|---|---|
| 4,889,160 A | * | 12/1989 | Sheets ..................... | F16K 24/00 |
| | | | | 137/384 |
| 9,267,699 B1 | * | 2/2016 | Souza ........................ | E03F 5/08 |
| 2005/0022878 A1 | * | 2/2005 | Erinakes ................. | E03B 11/08 |
| | | | | 137/587 |
| 2005/0233691 A1 | * | 10/2005 | Horton .................... | E04D 13/17 |
| | | | | 454/366 |
| 2015/0020510 A1 | * | 1/2015 | Zhang ................... | F01N 13/085 |
| | | | | 60/324 |

* cited by examiner

*Primary Examiner* — Steven B McAllister
*Assistant Examiner* — Charles R Brawner
(74) *Attorney, Agent, or Firm* — Phillip Black; Dossey & Jones, PLLC

(57) ABSTRACT

The disclosure includes a method and apparatus for protecting an air vent pipe. In one or more embodiments, a cover can include a plurality of sidewalls and a pipe portal disclosed through at least one of the side walls. The distal end of an air vent pipe can be disposed through the pipe portal and into the internal volume of the cover. A clamp can secure the cover to the air vent pipe. An access door disposed in a side wall can give access to the clamp and distal end of the air vent pipe and closing and locking the access door with a locking mechanism can prevent unauthorized users from accessing the distal end of the air vent pipe.

9 Claims, 5 Drawing Sheets

COVER

FIELD OF INVENTION

The present invention is directed to a cover for a vent. Though its use spans several industries, the cover is described herein in the context of underground aquifer protection.

GENERAL BACKGROUND

Aquifers are underground layer of water-bearing permeable rock, rock fractures or unconsolidated materials. Aquifers are both permeable and porous and include such rock types as sandstone, conglomerate, fractured limestone and unconsolidated sand and gravel. Groundwater is primarily precipitation that has infiltrated the soil beyond the surface and collected in empty spaces underground.

The water in an aquifer most often begins as rain or snow melt that seeps into the ground. The amount of water that makes its way to the aquifer varies widely from place to place depending on the type of surface and underlying soils. Once underground, water will continue to be pulled downward until it reaches an impermeable layer of rock. The movement of water through small pores and the spaces between rocks acts as a natural filtering process, purifying the water and removing sediment. Sooner or later water will eventually leave the aquifer and need to be replenished through a process called "recharge".

After entering an aquifer, water moves slowly toward lower lying places and eventually is discharged from the aquifer from springs, seeps into streams, or is withdrawn from the ground by wells. Wells can be hand-dug, driven, or drilled. The pumping of wells can have a great deal of influence on water levels and water flow below ground, especially in the vicinity of the well. If water is withdrawn from the ground at a faster rate that it is replenished, either by infiltration from the surface or from streams, then the water table can become lower, resulting in a "cone of depression" around the well. Depending on geologic and hydrologic conditions of the aquifer, the impact on the level of the water table can be short-lived or last for decades, and it can fall a small amount or many hundreds of feet. For example, excessive pumping can lower the water table so much that the wells no longer supply water. The well and/or the well casing creates communication between the surface and the water within an aquifer at depth and wells generally include a surface structure to perform multiple functions, including restricting air flow through one or more pipes that vents air into and out of the well. The well's vent pipe allows airflow into and out of the well as water levels change underground.

Groundwater pollution, also called groundwater contamination, occurs when pollutants are released to the ground and make their way down into groundwater. The pollutant often creates a contaminant plume within an aquifer. Movement of water and dispersion within the aquifer spreads the pollutant over a wider area. Its advancing boundary, often called a plume edge, can intersect with groundwater wells or daylight into surface water such as seeps and springs, making the water supply unsafe for humans and wildlife. The movement of the plume, called a plume front, may be analyzed through a hydrological transport model or groundwater model. Analysis of groundwater pollution may focus on soil characteristics and site geology, hydrogeology, hydrology, and the nature of the contaminants.

Pollution can occur from on-site sanitation systems, landfills, effluent from wastewater treatment plants, leaking sewers, petrol filling stations or from over application of fertilizers in agriculture. Using polluted groundwater causes hazards to public health through poisoning or the spread of disease. To prevent or reduce contamination, many wells use a surface seal. Deeper wells are commonly cased after the driving or drilling process is complete. This creates an impermeable seal from the surface to the next confining layer that keeps contaminants from traveling down the outer sidewalls of the casing or borehole and into the aquifer.

The access to the aquifer created by the well creates a direct route for contaminates to the heart of an aquifer and the use of the well can directly cause the scattering and widespread distribution of any contaminates introduced through the well. As such, securing a well at the surface from ill willed terrorists/pranksters/criminals should be paramount. However, it is often not considered by the controller of the well. A need exists for a device to preventing tampering of a well and the surface components of a well, including the well vent.

SUMMARY

The present invention provides a lockable cover and method for using the lockable cover at a well site to protect the integrity of an aquifer. The lockable cover includes a container unit with locking mechanism to be disposed about the top end of a well component, primarily the well vent.

Additional aspects of the lockable cover disclosed herein can include methods of making and using the same in accordance with the foregoing aspects. It should also be noted that the cover further encompasses the various possible combinations of the aspects and features disclosed herein.

BRIEF DESCRIPTION OF THE DRAWING(S)

The accompanying drawings illustrate various exemplary implementations and are part of the specification. The illustrated implementations are proffered for purpose of example, not for purpose of limitation.

DETAILED DESCRIPTION

While features of cover, namely the access points, are shown to be disposed in a particular side, the embodiment is not limited by those designations and those features may be disposed in one or more of the other sides. Each side can be made partially of or completely of a rigid wall and, therefore, may be referred to herein as a "sidewall." Terms like "first," "second," "top," "bottom," "front," and "back" are intended to be terms of reference and are not limiting for any embodiment of this disclosure. The cover, as explained herein, is intended to secure the top portion of a vent by securing to the top of the vent and then being locked shut so that those without the ability to unlock the lock cannot gain access to the internal volume of the container body of the cover. As such, use of the term "access" general refers to an individual physically accessing the internal components or internal volume of the cover.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
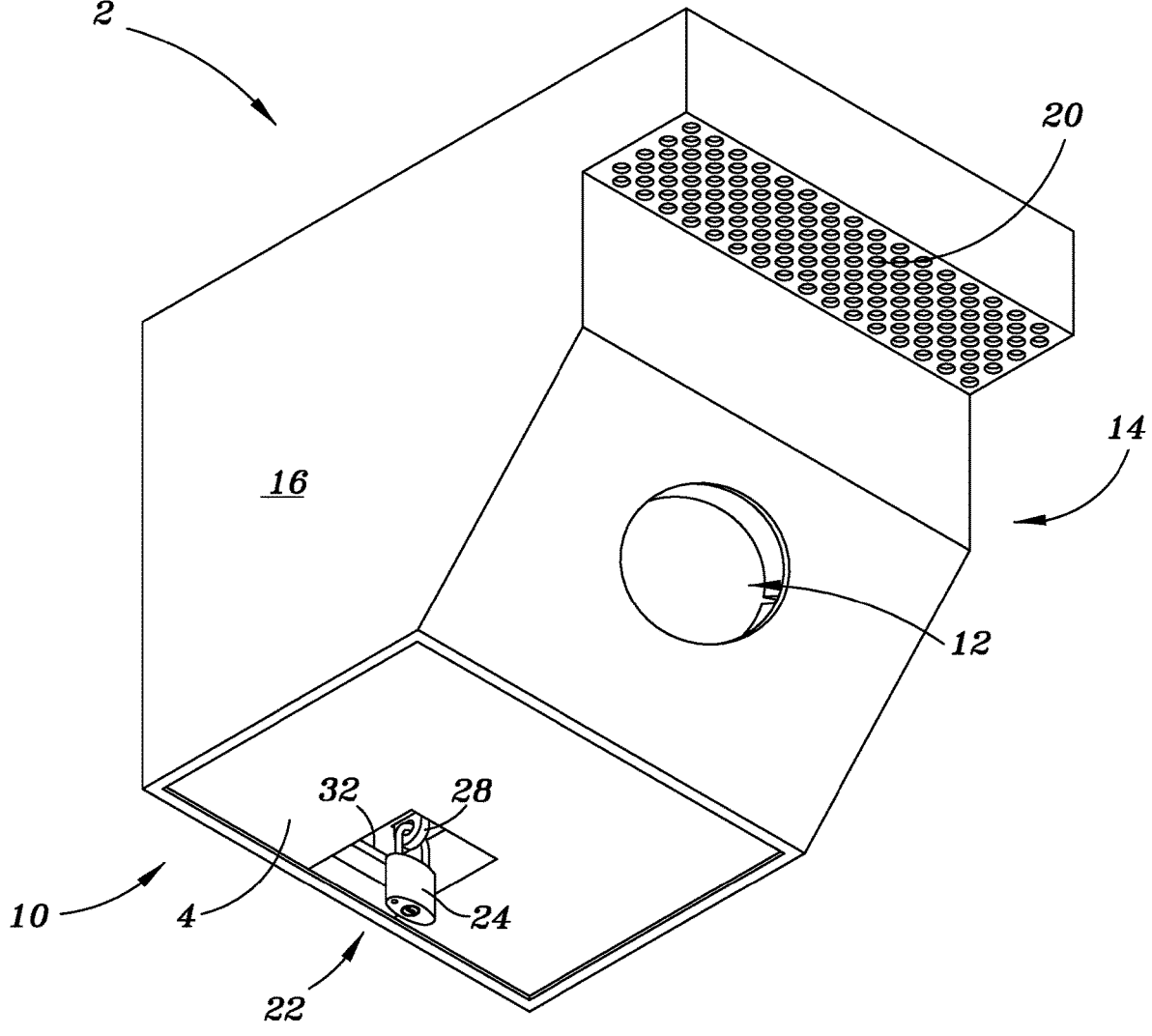
FIG. 1 depicts a perspective view of the lockable cover, as shown and described herein.
Figure 2:
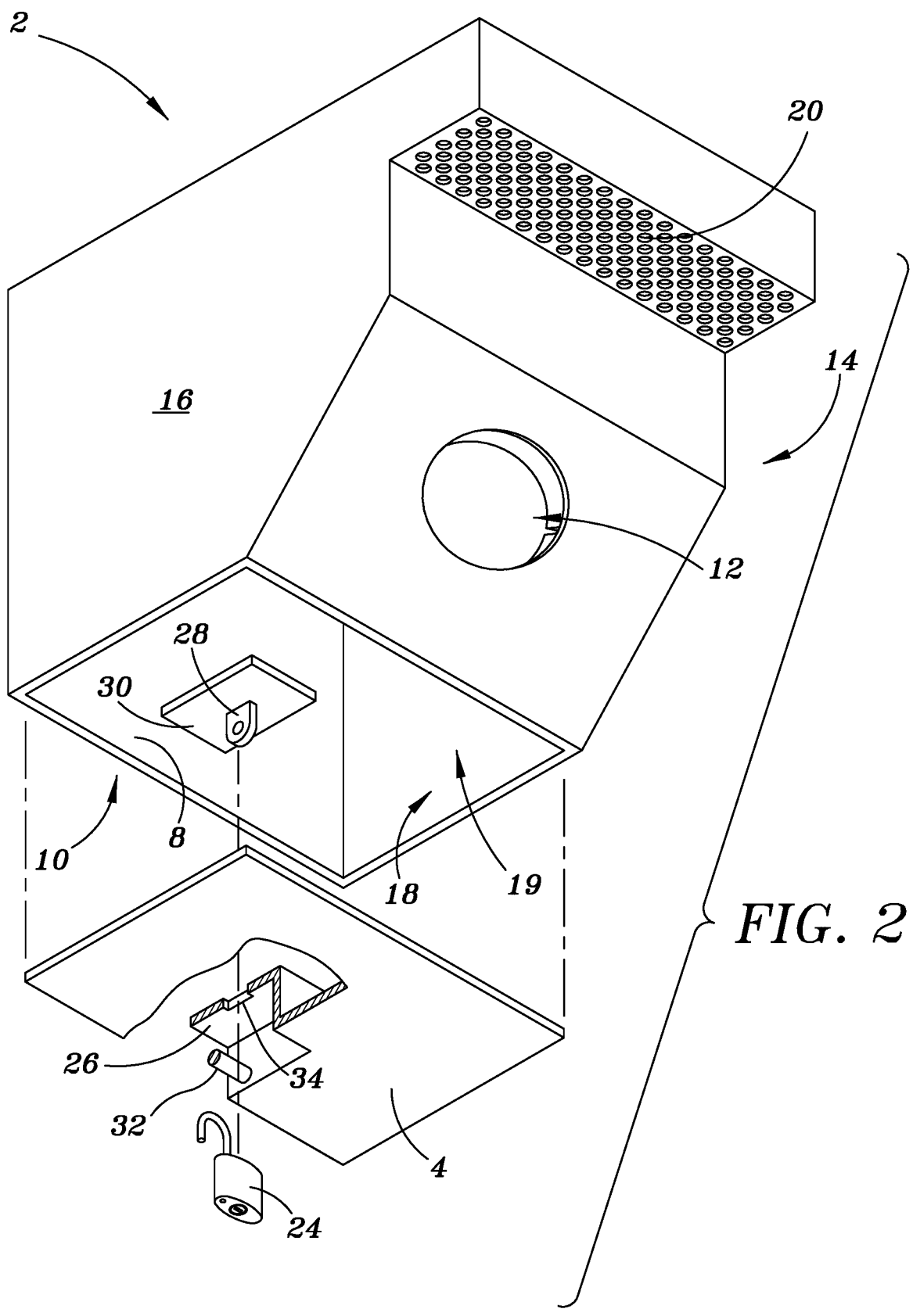
FIG. 2 depicts an exploded view of the lockable cover, as shown and described herein.

FIG. 1 depicts a perspective view of the cover 2 and FIG. 2 depicts an exploded perspective view of the cover 2. The cover 2 includes a body having a plurality of sides and an internal volume 19. As shown, the cover 2 can include a top side 6, a first and second side 16, 18, a front side 14, a back side 8, and a bottom side 10. The front side 14, also referred to as the "front sidewall" herein, is the vertical surface configured between the air vent 20 and the surface in which the pipe portal 12 is disposed. The air vent 20 and pipe portal 12 are described further herein.

There are one or more points of access to the internal volume 19 from the outside, which can include the access door 4, the pipe portal 12, and the air vent 20. The cover 2 includes an access door 4, which can be removed and can be locked into place via a locking assembly. As shown, the access door 4 can be disposed about a bottom side of the cover 2, such that removal of the access door 4 provides a relatively large access point. The access door 4 can include a position for a lock assembly 22. As shown, the access door 4 can include an indented cavity to house the lock assembly 22 so that the lock assembly 22 does not unnecessarily protrude from the surface of the cover 2.

The locking assembly 22 can include a lock 24, a lock surface 26, a lock receiver 28, a receiver mount 30, or any combination thereof. The lock 24 can be one of a variety of types of lock, including a key-lock or combination lock. For a key-lock, a key can be used to unlock and open the access door 4. For a combination lock, the combination can be applied to unlock and open the access door 4. As shown, the locking assembly 22 can be disposed about a rear portion of the access door 4, toward the back of the cover 2. Referring to FIG. 2, the lock receiver 28 can be disposed about, or extend from, the receiver mount 30. The receiver mount 30 can be disposed about the interior surface of the back wall of the cover 2. In an alternative embodiment, the lock receiver 28 can extend directly from the surface of the back wall of the cover 2. In other embodiments, the locking mechanism can be disposed about one of the other sides 14, 16, 18 of the cover 2.

For securing the access door 4 to the body of the cover 2, a user can align and seat the access door 4 with the bottom side portal as well as align and seat the lock receiver 28 with the lock receiver hole 34 such that the lock receiver 28 extends through the lock receiver hole 34. A lock 24 can then extend through the lock receiver 28, effectively securing the access door 4 in position so that it cannot be removed and so that the access door prevents physical access through the bottom side 10.

Figure 3:
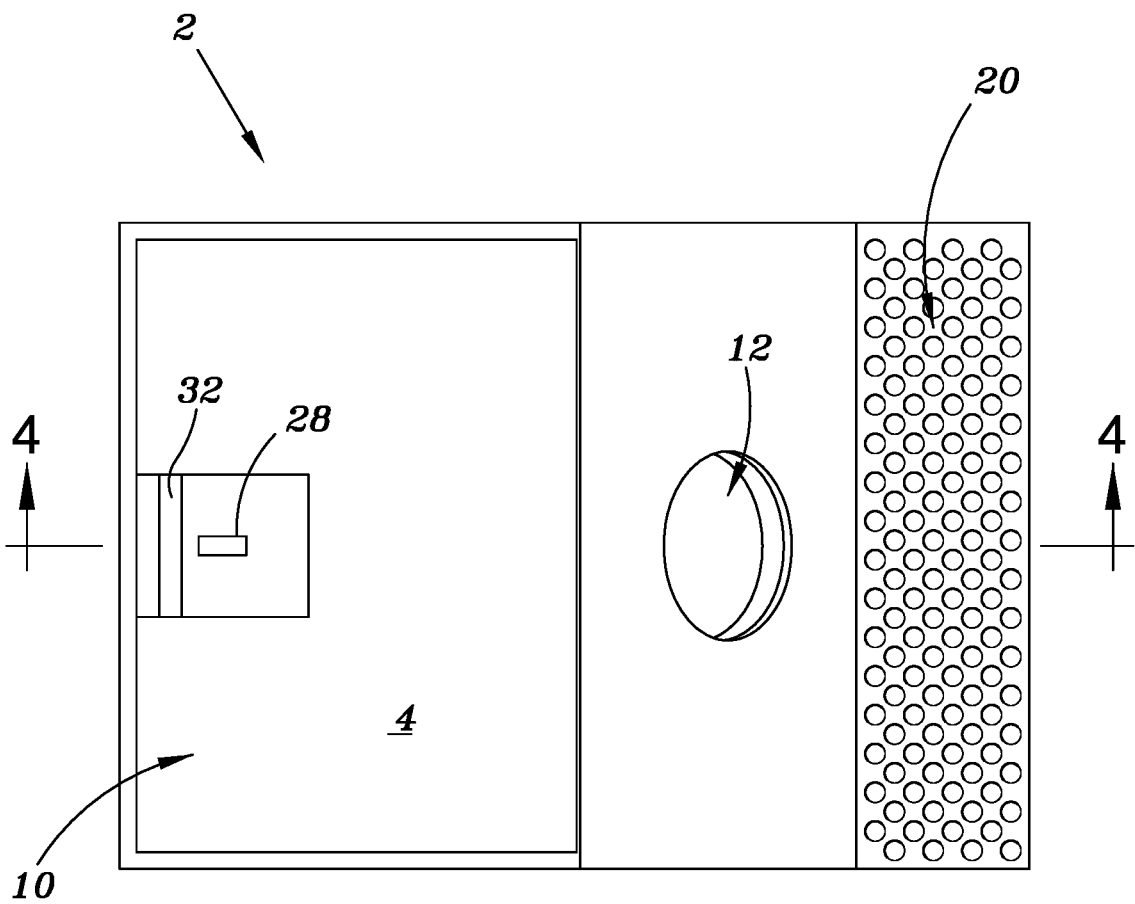
FIG. 3 depicts a bottom view of the cover, as shown and described herein.

FIG. 3 depicts a bottom view of the cover 2. The cover 2 can also include the pipe portal 12 disposed in a wall of the cover 2. In alternative embodiments, the access door 4, and corresponding access opening, can be disposed in another surface of the cover 2. The bottom surface, as shown, can be preferable as it is not immediately visible to a person standing a distance away from the cover 2. As such, it is less likely the person would be drawn to the cover 2 to attempt to open it. For the same or similar reasons, the air vent 20 can be disposed in a surface of the cover 2 that is facing down so that it is not immediately visible to the person. As such, the position of the air vent 20 can be such that there is no visible access to the pipe 42 and/or interior of the pipe portal 12. Preventing visible access to at least the distal end of the pipe 42 and/or the interior of the pipe portal 12 should prevent a person from being able to place any item into the air vent pipe from the outside of the cover. The position of the air vent 20 can be such that there is no gravitational access to the pipe 42 and/or interior of the pipe portal 12. That is to say, a person cannot maneuver the cover 2 to pour or drop a liquid or solid object through the air vent 20 and into the pipe 42.

The downward facing air vent 20 also prevents rain or other fluids from accessing, or entering, the pipe 42. The portion of the front surface of the cover 2 through which the pipe portal 12 is disposed is shown to be slanted at about a 45-degree angle between the top of the cover 2 and the bottom of the cover 2. At this angle, the access door 4 and the air vent 20 are both retained in, or facing, a downward direction when attached to the pipe 42.

Figures 4, 5:
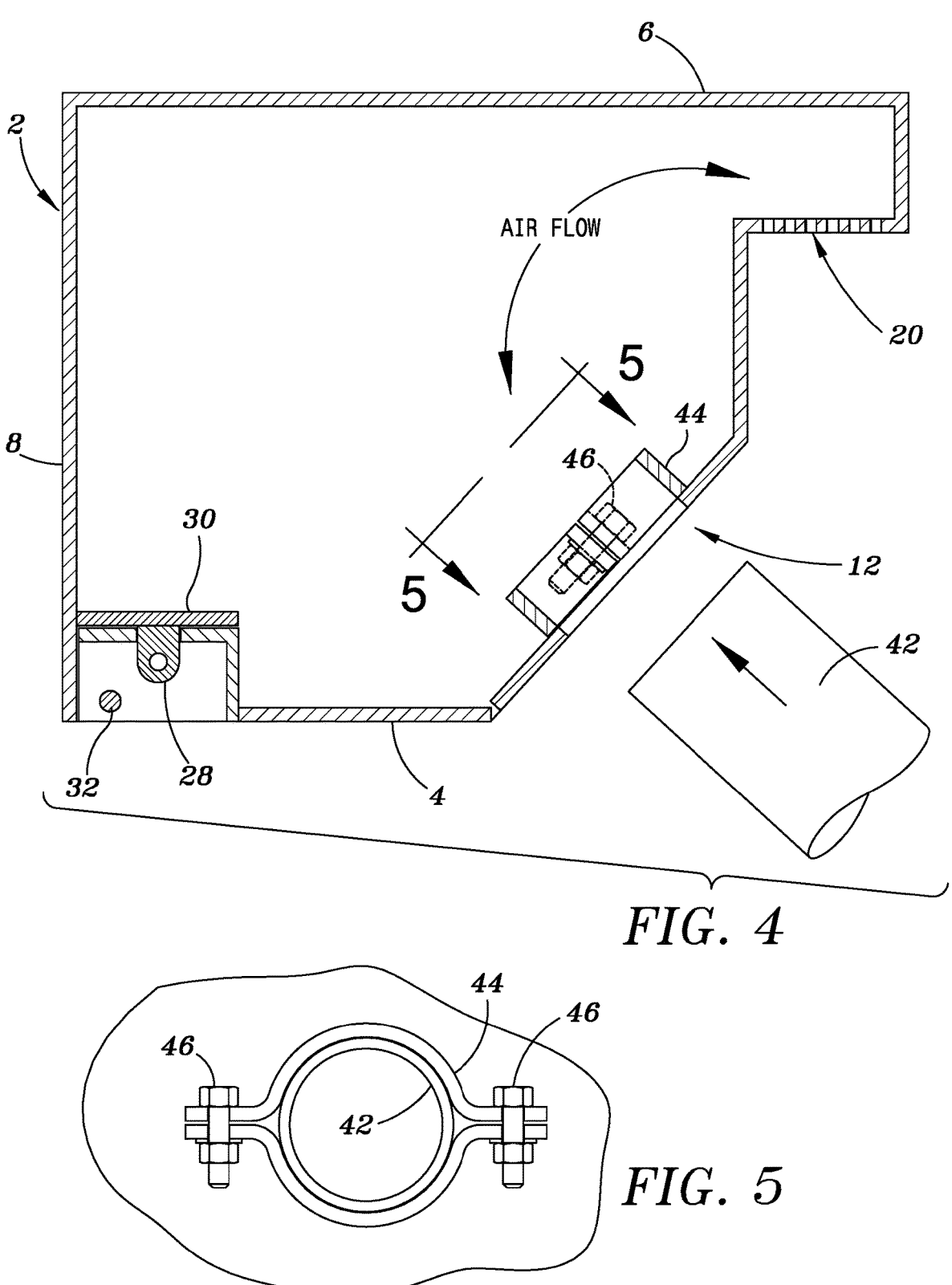
FIG. 4 depicts a cross-sectional view of the cover, as shown and described herein.
FIG. 5 depicts an interior surface view at the securing mechanism, as shown and described herein.

As shown, the pipe portal 12 can be disposed through a front surface of the cover 2. Referring to FIGS. 4 and 5, a well vent 42, also referred to as the "pipe," can be disposed through the pipe portal 12 and a securing mechanism 44 can then be secured to the end of the pipe 42. Once secured, the cover 2 can not be removed by sliding the over 2 completely off the pipe 42. As shown herein, the securing mechanism can include a clamp. To properly secure the cover 2 to the pipe 42, the cover 2 can slide over the pipe 42 so that the distal end of the pipe 42 is within the internal volume of the cover 2 through the pipe portal 12. The clamp 44 can then be disposed on and tightened around the end of the pipe 42 such that the clamp 44 does not move or slide along the pipe 42 when longitudinal force is applied to the clamp 44. Notably, if the cover 2 is pulled in an outward direction in an attempt to remove the cover 2 from the pipe 42. The clamp 44 can include one of several possible embodiments. As shown, the clamp 44 includes a two-piece ring structure than can be tightened at two points along the clamp 44 by tightening a fastener (i.e., a bolt or screw).

The securing mechanism and distal end of the pipe 42 can be accessed through the bottom side when the access door 4 is removed. For installation, the access door 4 is removed and the cover 2 is slid onto the end of a vent pipe 42 through the pipe portal 12. The access door 4 can include a handle 32, or grip, for easy handling of the access door 4. Through the bottom side 10, the user can properly dispose and tighten the securing mechanism 44 around the end of the pipe 42. The user can the secure the access door 4 in place via the lock 24 and lock receiver 28, as discussed in reference to FIGS. 1 and 2. For removal, the lock 24 can be unlocked and removed from the lock receiver 28, and the access door 4 removed. The user can then access and loosen and/or remove the securing mechanism 44 from the pipe 42. The cover 2 can then be removed by sliding the cover 2 off the end of the pipe 42.

Once the cover 2 is disposed on the pipe 42, air, indicated in FIG. 4 as "AIRFLOW," can travel from the pipe/well vent 42 through the air vent 20 of the cover 2. As shown herein, the air vent 20 can be disposed in a protruding section about the front of the cover 2. The protrusion section can provide a surface about the first sidewall to turn internal volume access directionally away from the main interior. More importantly, away from the vent pipe 42 so that direct visually or gravitational is almost entirely, or entirely, restricted from the outside of the cover 2 through the air vent 20. As shown, the air vent holes are disposed in the underside of the protrusion section so that visual access is limited to the top sidewall 6 of the cover 2. In an alternative embodiment, the air vent 20 can be disposed in an indention, cavity, or inlay in a sidewall where, again, visual and physical access are limited and directed away from the main internal volume of the cover.

The air vent 20 can include one or more holes through the sidewall of the cover 2 so that air can flow to and from the internal volume of the cover 2 to the outside of the cover 2. It is intended, however, that the holes are small enough so that a person or animal can not put its hand, fingers, or other appendages into the cover and, more importantly, cannot access the top of the pipe 42 to allow it cannot direct a substance into the pipe 42. Referring to FIG. 4, the placement of the air vent 20 restricts a person or animal from reaching into the cover 2 and/or otherwise directing a fluid or solid into the end of the pipe 42. In alternative embodiments, the air vent 20 can be disposed about other portions or other surfaces of the cover 2. For example, the air vent 20 could instead or additionally be disposed in the access door 4.

Figure 6:
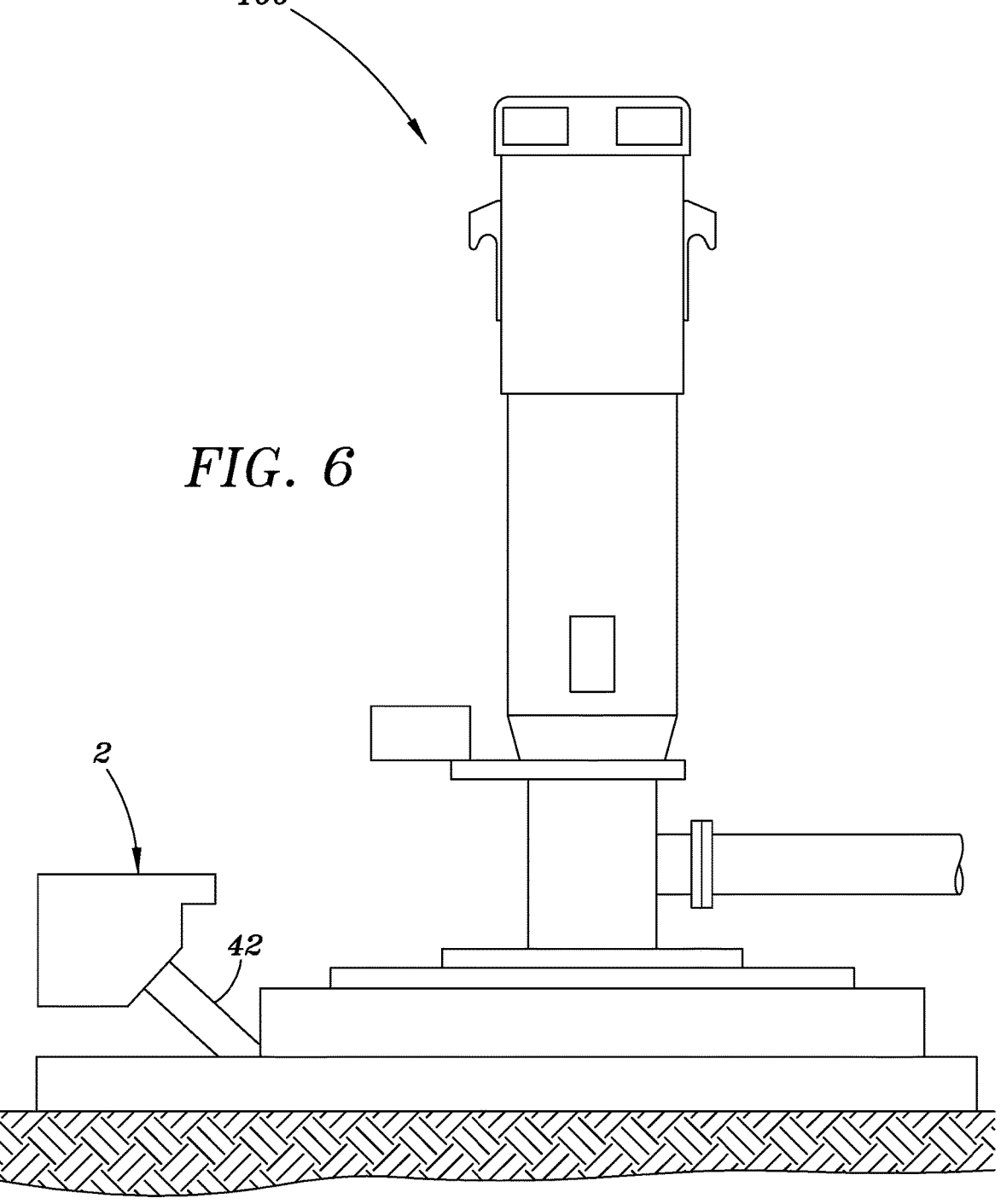
FIG. 6 depicts the cover 2 in an environment of use, as shown and described herein.

FIG. 6 depicts the cover 2 in an environment of use. The cover 2 is secured to an air vent pipe 42 that is extending from the subsurface portion of a water well. The water well surface components 100 can include various pumps, gauges, valves, pipes, and holding tanks to control the well underground. As water is brought to the surface, the air vent pipe 42 allows the subsurface portion of the well to balance out any changes in pressure below ground.

Unless otherwise defined, all technical and scientific terms used herein have the same meanings as are commonly understood by one of ordinary skill in the art to which this disclosure belongs. Although methods similar or equivalent to those described herein can be used in the practice or testing of the present disclosure, suitable methods are described herein.

It will be appreciated by persons skilled in the art that the present disclosure is not limited to what has been particularly shown and described hereinabove. Rather, the scope of the present disclosure is defined by the appended claims and includes both combinations and sub-combinations of the various features described hereinabove as well as variations and modifications thereof, which would occur to persons skilled in the art upon reading the foregoing description.

What is claimed is:

1. A cover, comprising:
   a plurality of sidewalls forming an internal volume, the plurality of sidewalls comprising:
      a front sidewall;
      a top sidewall;
   an access door and a locking mechanism, wherein the locking mechanism secures the access door to one of the plurality of sidewalls, and wherein the locking mechanism comprises:
      a receiver mount disposed about an interior surface of the cover,
      a lock receiver extending from the receiver mount,
      a lock surface disposed on the access door, wherein the lock surface comprises a lock receiver hole, and
      a lock;
   a protrusion section extending from the front sidewall in a direction parallel to the top sidewall, wherein the front sidewall is accessed below the protrusion section;
   one or more air vents disposed in the protrusion section; and
   a pipe portal disposed in one of the sidewalls,
      wherein the pipe portal comprises a clamp in the internal volume and configured to be secured about a distal end of a pipe,
      wherein when the clamp is secured about the distal end of the pipe, the cover cannot be removed from the pipe by pulling on the cover,
      wherein the clamp is fixed to the sidewall in which the pipe portal is disposed,
      wherein the clamp is accessed via the access door, and
      wherein the direction of access to the clamp via the access door is against gravity.

2. The cover of claim 1, wherein the one or more air vents prevent a person from reaching into the internal volume of the cover.

3. The cover of claim 1, wherein the one or more air vents are positioned such that there is no visible access to the pipe.

4. The cover of claim 1, wherein the one or more air vents are configured over the pipe whereby no liquid can be poured directly through the air vents into the pipe.

5. The cover of claim 1, wherein the access door has an open and closed position and wherein the locking mechanism has a locked and an unlocked position.

6. The cover of claim 5, wherein when the pipe is secured by the clamp, the access door is in the closed position, and the locking mechanism is in the locked position, the interior volume is inaccessible to a person.

7. The cover of claim 1, wherein the one or more air vents are positioned such that there is no gravitational object access to the pipe.

8. The cover of claim 1, wherein the access door is disposed in a first sidewall and the pipe portal is disposed in a second sidewall,
   wherein the second sidewall is configured at a nonparallel and non-perpendicular angle to the first sidewall.

9. The cover of claim 3, wherein the one or more air vents are configured over the pipe.

* * * * *